United States Patent
Parker et al.

(10) Patent No.: US 8,112,295 B1
(45) Date of Patent: Feb. 7, 2012

(54) PERSONALIZED HOSPITALITY MANAGEMENT SYSTEM

(75) Inventors: Benjamin James Parker, Overland Park, KS (US); Rick Hulett, Hood River, OR (US); Brian Michael Huey, Kansas City, MI (US); Randolph Keith Hiser, Overland Park, KS (US)

(73) Assignee: Embarq Holdings Company LLC, Overland Park, KS (US)

( * ) Notice: Subject to any disclaimer, the term of this patent is extended or adjusted under 35 U.S.C. 154(b) by 1694 days.

(21) Appl. No.: 10/304,226

(22) Filed: Nov. 26, 2002

(51) Int. Cl.
*G06Q 10/00* (2006.01)
(52) U.S. Cl. .......... 705/5; 705/1.1; 705/14.49; 715/747; 340/539.13
(58) Field of Classification Search ................ 705/1, 37, 705/1.1, 5, 14.49; 725/36; 715/747; 340/539.13
See application file for complete search history.

(56) References Cited

U.S. PATENT DOCUMENTS

| | | | | |
|---|---|---|---|---|
| 5,099,319 | A * | 3/1992 | Esch et al. ............... | 725/36 |
| 5,633,810 | A * | 5/1997 | Mandal et al. ............ | 370/431 |
| 6,192,248 | B1 | 2/2001 | Solondz | |
| 6,202,083 | B1 | 3/2001 | Chrabaszcz | |
| 6,734,886 | B1 | 5/2004 | Hagan et al. | |
| 6,865,574 | B1 | 3/2005 | McCullough | |
| 2001/0037465 | A1* | 11/2001 | Hart et al. ............... | 713/201 |
| 2002/0095481 | A1 | 7/2002 | George et al. | |
| 2003/0041159 | A1 | 2/2003 | Tinsley et al. | |
| 2003/0045239 | A1 | 3/2003 | Buckingham et al. | |
| 2003/0061145 | A1* | 3/2003 | Norrid .................... | 705/37 |
| 2003/0061295 | A1 | 3/2003 | Oberg et al. | |
| 2003/0065744 | A1 | 4/2003 | Lam et al. | |
| 2003/0074456 | A1 | 4/2003 | Yeung et al. | |
| 2003/0149576 | A1* | 8/2003 | Sunyich .................... | 705/1 |
| 2005/0216848 | A1 | 9/2005 | Thompson et al. | |
| 2005/0261058 | A1 | 11/2005 | Nguyen et al. | |
| 2006/0041648 | A1 | 2/2006 | Horvitz | |

OTHER PUBLICATIONS

Non-Final Office Action dated May 26, 2008 for U.S. Appl. No. 10/331,818.
Response filed Aug. 26, 2006 to Non-Final Office Action dated May 26, 2008 for U.S. Appl. No. 10/331,818.
Final Office Action dated Mar. 12, 2007 for U.S. Appl. No. 10/331,818.
Response filed Jun. 12, 2007 to Final Office Action dated Mar. 12, 2007 for U.S. Appl. No. 10/331,818.
Non-Final Office Action dated Aug. 21, 2007 for U.S. Appl. No. 10/331,818.
Response filed Nov. 21, 2007 to Non-Final Office Action dated Aug. 21, 2007 for U.S. Appl. No. 10/331,818.
Final Office Action dated Feb. 25, 2008 for U.S. Appl. No. 10/331,818.
Response filed May 27, 2008 to Final Office Action dated Feb. 25, 2008 for U.S. Appl. No. 10/331,818.
Non-Final Office Action dated Jun. 26, 2008 for U.S. Appl. No. 10/331,818.
Response filed Sep. 26, 2008 to Non-Final Office Action dated Jun. 26, 2008 for U.S. Appl. No. 10/331,818.

(Continued)

*Primary Examiner* — Heidi Riviere

(57) ABSTRACT

The invention is a method and system for customizing a plurality of hospitality site amenities based on a stored user profile. Certain check-in procedures are reduced or eliminated. Hospitality sites are able to provide a guest with an abundance of personalized services without a corresponding increase in staff size. Guests experience customized hotel amenities, environments, and media renderings.

46 Claims, 2 Drawing Sheets

OTHER PUBLICATIONS

Final Office Action dated Jan. 6, 2009 for U.S. Appl. No. 10/331,818.
Response filed Apr. 3, 2009 to Final Office Action dated Jan. 6, 2009 for U.S. Appl. No. 10/331,818.
Non-Final Rejection date mailed Jun. 25, 2009 in U.S. Appl. No. 10/331,818.
Response filed Sep. 25, 2009 to Non-Final Rejection date mailed Jun. 25, 2009 in U.S. Appl. No. 10/331,818.
Final Rejection date mailed Jan. 12, 2010 in U.S. Appl. No. 10/331,818.
RCE/Response filed Jun. 11, 2010 for U.S. Appl. No. 10/331,818.
Non-Final Office Action date mailed Aug. 17, 2010 for U.S. Appl. No. 10/331,818.

* cited by examiner

PERSONALIZED HOSPITALITY MANAGEMENT SYSTEM

CROSS-REFERENCE TO RELATED APPLICATIONS

Not applicable

STATEMENT REGARDING FEDERALLY SPONSORED RESEARCH OR DEVELOPMENT

Not applicable.

TECHNICAL FIELD

This invention is related to the field of property management. More particularly, the present invention provides a new and useful system and method for customizing hospitality services at hospitality sites, such as hotels.

BACKGROUND OF THE INVENTION

The hotel industry has long been viewed as a customer-service industry in addition to its primary objective of "providing a bed for the night." In fact, some hotels have developed outstanding accommodations that are commonly used as convention centers and reception halls rather than temporary living quarters. To distinguish the difference in accommodations and services a guest can expect from a particular hotel, the one-to-five-star rating system, an internationally recognized business practice, is applied. The British Tourist Authority has the following to say about star ratings: "star ratings symbolize the level of service, range of facilities, and quality of guest care that you can expect. Hotels are required to meet progressively higher standards as they move up the scale from one to five stars." A hotel with a one-star rating offers practical accommodation with a limited range of facilities and services, but a high standard of cleanliness throughout and 75 percent of bedrooms will have private bathroom facilities. A five star hotel offers the highest international quality of accommodation, facilities, services and cuisine. There will be a range of extra facilities to make the patron feel well cared for by professional, attentive staff who provide flawless guest services.

Presently, most five-star hotels employ some form of computerized property-management system to enable them to track a guest's stay duration, pay-per-view ordering, room-service ordering, smoking/nonsmoking room request, etc. Current property-management systems offer a marginal benefit to the hotels that employ them beyond tracking account activity. In addition, they offer virtually no added value to the hotel guest. A limited number of guest preferences such as smoking/nonsmoking rooms are indicated during booking of the room or at check-in, but no mechanism exists, save the present invention, to keep track of guest preferences and to make these preferences known to various associated hotels. Thus, a hotel in southern Florida does not follow or learn about preferences from guests who stay in western Missouri.

The prior art results in a great deal of time wasted by the guest and hotel staff continually traversing the same process during room booking and check-in. A new system is needed to streamline the process to reduce wasted effort and provide a greater variety of customized services. For example, it is common for hotels to provide guests with complimentary copies of national newspapers. However, no mechanism currently exists for a hotel to know the dates of a particular guest's visit and to order the appropriate preferred newspaper. In this way, a guest from Kansas City could stay informed on the daily progress of the local city football team during an autumn stay in Miami.

A more specific list of desirable improvements over the prior art follows. It is desirable and currently unavailable for a hotel to provide a mechanism for a guest to specify specific details of the guest-room environment. It is desirable for the hotel to already know the room temperature, bathroom amenities, lighting, décor and the like that a guest prefers and have the room prepared accordingly. It is also desirable for a hotel to know a guest's music and television preferences and have the appropriate media content available. An opportunity for significant resource conservation exists if only certain media content is delivered. In practice, the prior art delivers a great deal more media content to guest rooms than is consumed by the guests. The customization of other hotel amenities such as minibar selections, laundry pick-up time, and business services is also desirable. Tracking a guest's location within the hospitality site for customizing the environment of the occupied room, such as the health club, would also be advantageous.

SUMMARY OF THE INVENTION

The present invention solves at least the above problems by providing a system and method for customizing hospitality services within a hospitality site. Offering several practical applications in the technical arts, the present invention reduces lengthy check-in procedures, increases the flexibility of a hospitality site's current amenities, and allows hospitality sites to offer additional customized amenities. The present invention accomplishes the above with little or no additional staffing.

The present invention provides a method for customizing a guest's stay at a hospitality site by creating, populating, storing and sharing with other hospitality sites a guest's user profile, which contains information related to a specific guest or a group of guests. Based on a guest's user profile, a wide variety of hotel amenities are customized.

The present invention also provides a system that expands the role of traditional property-management systems to include personalizing the environment and hospitality services available to a visiting guest. The system includes a user-profile database for storing the user profile, which contains information related to a specific guest or a group of guests including guest preferences. The system also includes a data-entry component for gathering information stored in the user profile. A control module that monitors and controls the other components in the system is contained in a computer-readable medium and is responsible for decision making within the system. The control module interacts with a guest-interface component to customize a wide array of hospitality-site amenities based on information stored in the guest's user profile.

In this way, a personalized hospitality management system (PHMS) expands the customer service options currently available and offers solutions to common problems found in the prior art.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention enables a property-management system to store a particular guest's likes and dislikes and use this data to create a more enjoyable visit. The property-management system now becomes a personalized hospitality-management system (PHMS). A PHMS-equipped site can share information about a particular guest with any other connected PHMS-equipped site. This enables the creation of a consistent, comfortable, and familiar guest experience across several hospitality sites.

A PHMS can control and customize many aspects of facility amenities, media offerings, and a guest's room environment. The ability to control media offerings enables more particular tracking and billing of media consumed by the guest. Furthermore, PHMS may originally be programmed with guest information, but it can also learn guest likes and dislikes by monitoring guest behavior.

Figure 1:
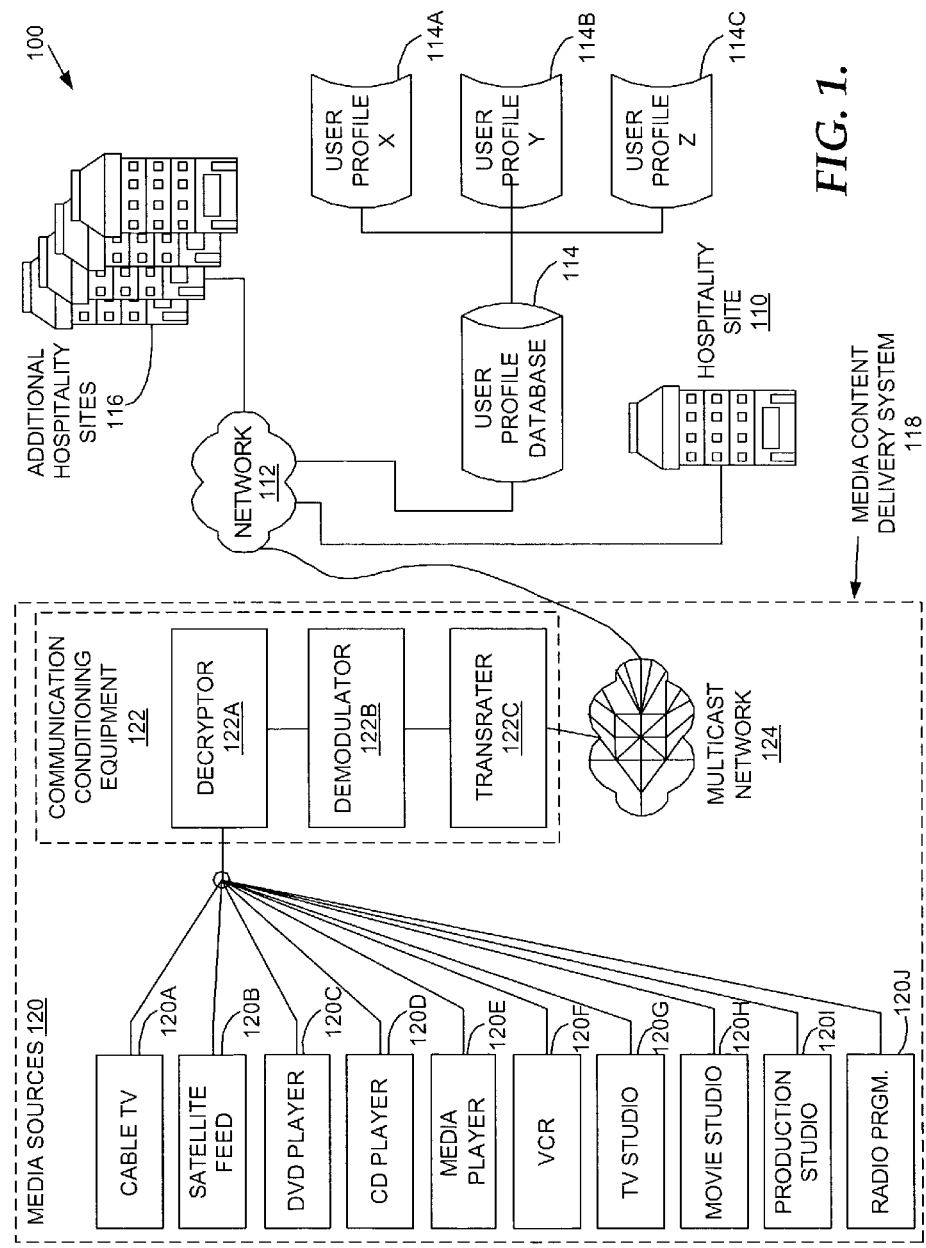
FIG. 1 is a block diagram depicting a general view of the major components involved in a PHMS.
Figure 2:
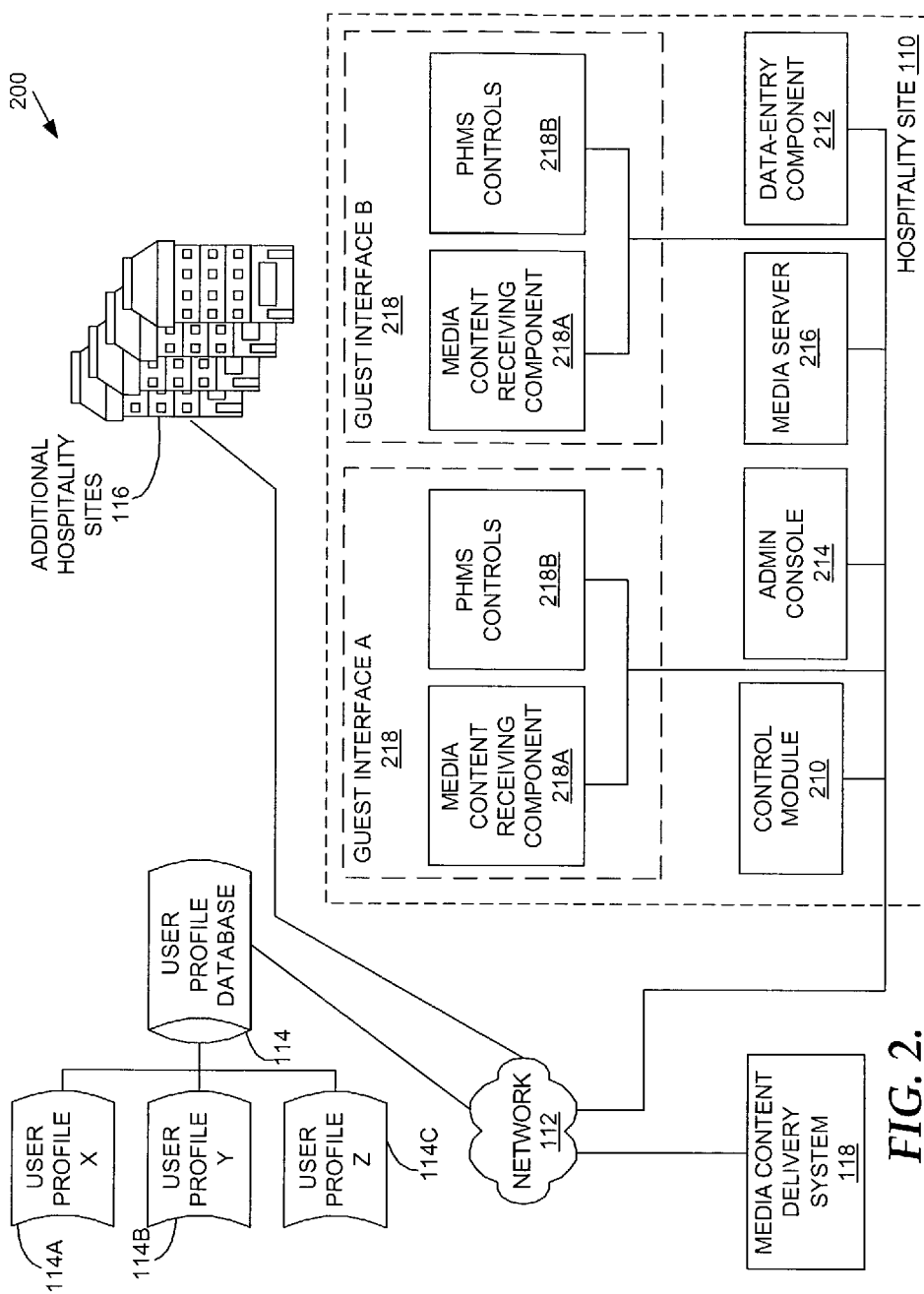
FIG. 2 is a block diagram of a PHMS that depicts the components within a hospitality site in greater detail.

Referring to FIGS. 1-2, the present invention is a PHMS 100 implemented at a hospitality site 110. FIG. 1 is a high-level depiction of the major systems involved in a property-management system suitable for implementing the present invention. FIG. 2 is a block diagram primarily detailing the hospitality site 110 components. Hospitality site 110 is a place where a guest is hosted. Exemplary hospitality sites include, but are not limited to a hotel, motel, cruise ship, restaurant, fitness club, time-share, hospital, dormitory or any other place that offers temporary quartering facilities. As seen in FIG. 2, hospitality site 110 includes several PHMS components including a control module 210, a data-entry component 212, an administrative console 214, a media server 216, and one or more guest interfaces 218. More detail on these components is provided below.

Hospitality site 110 is connected to a computer network 112. Network 112 is preferably a wide area network (WAN), but could also be a local area network (LAN) or the Internet. Also connected to network 112 is a user-profile database 114. User profile database 114 stores the user profiles, such as user profile X 114A, that contain guest information. In addition to information such as billing address and activity logs, the guest information stored in a user profile includes user preferences including facility-amenity preferences, room-environment preferences, and media preferences. Depending on the nature of the hospitality site, generic preference categories vary. Examples of facility-amenity preferences include, but are not limited to, wake-up-time preferences, check-out preferences, incentive-program preferences, health-club-usage preferences, room-location preferences, facility-access preferences, minibar preferences, Internet-access preferences, telephony preferences, concierge-desk preferences, business-services preferences, parking preferences, special-assistance services preferences, and laundry preferences. Room-environment preferences include, but are not limited to home-page preferences, room-lighting preferences, décor preferences, room-temperature preferences, eating preferences, room-service preferences, convenience preferences, room-location preferences, sleeping-arrangement preferences, aroma preferences, bathroom-amenity preferences and smoking preferences. Exemplary media preferences include television-channel preferences, language preferences; genre preferences, service-duration preferences, viewing preferences, topic preferences, ratings preferences, actor preferences, style preferences, era preferences, artist preferences, protocol preferences, and format preferences.

Additional hospitality sites 116, which are PHMS equipped, can access user-profile database 114 via network 112. Guest information available to one hospitality site 110 is made available to all hospitality sites connected to network 112.

A media content delivery system (MCDS) 118 delivers all forms of media, audio and visual, in a network-compatible format. MCDS 118 can also send other forms of data. Preferably, the media information and data are communicated as Internet Protocol (IP) packets. One skilled in the relevant art would appreciate the array of protocols that would be acceptable, not limited to a Transmission Control Protocol/Internet Protocol (TCP/IP), a File Transfer Protocol (FTP) a Hypertext Transfer Protocol (HTTP), and an International Telecom Union (ITU) protocol. The media information could also be sent in a proprietary protocol or any other protocol that can be used in a computer network. In addition to media content, data can also be communicated over MCDS 118.

MCDS 118 communicates media content over network 112. As seen in FIG. 1, MCDS 118 includes a number of media sources 120. Media sources 120 supply media content in various forms that is transformed by other components of MCDS 118 into a network-compatible format. Many acceptable raw-media sources for providing media content exist including cable TV 120A, a satellite feed 120B, a Digital Versatile Disc (DVD) player 120C, a Compact Disc (CD) player 120D, a media player 120E, a Video Cassette Recorder (VCR) 120F, a TV studio 120G, a movie studio 120H, a production studio 120I, and a radio program 120J. As would be understood by one skilled in the art, any device capable of transmitting media via electrical, electronic, or electromagnetic signals is an acceptable media source 120 for the MCDS 118.

MCDS 118 communicates information in a network-compatible format. MCDS 118 employs various types of communication-conditioning equipment 122 including a decryptor 122A, a demodulator 122B, and a transrater 122C. Raw-media content from the media sources 120 can be converted into a network-compatible format using some or all of this equipment, as appropriate. Decryptor 122A removes the encryption or "scrambling" of the incoming signal. Demodulator 122B removes the carrier wave from the incoming signal, thus leaving only the original signal before it was modulated with a higher frequency signal in preparation for transmission. Preferably, the data is communicated in an Asynchronous Serial Interface (ASI) stream feeding into transrater 122C. The data is conditioned and transferred in a form from demodulator 122B that can be converted to data packets that will be communicated over a network. Transrater 122C can receive incoming data at varying rates and transmit outgoing data at desired, selectable rates.

The data packets from transrater 122C are communicated over a multicast network 124. Multicast network 124 comprises multicast routers. Multicast routers are able to send data from one source to multiple destinations. Many hospitality sites 110 and 116 receive the contents of the media packets transmitted from communication conditioning equipment 122 to multicast network 124.

Refer now to FIG. 2, which examines hospitality site 110 in greater detail. As previously described, MCDS 118 communicates media information in a network-compatible format. This media information is communicated over network 112. Network 112 is also connected to hospitality site 110, control module 210, data-entry component 212, administrative console 214, media server 216, guest interface 218, and user-profile database 114.

Control module 210 controls and monitors the PHMS. The control module is the decision-making mechanism for PHMS. As one skilled in the relevant art would appreciate, control module 210 includes computer-readable code stored and executed in many possible ways including residing on a dedicated computer locally or remotely, residing on media server 216, or residing on another server elsewhere in the system. Control module 210 controls the PHMS and makes decisions based on user-profile information located on user-profile database 114 and instructions from administrative console 214. Control module 210 is responsible for carrying out the directives of administrative console 214.

Data-entry component 212 is used to populate user-profile database 114. Data-entry component 212 captures guest information and communicates it to user-profile database 114. Data-entry component 212 contemplates guest interaction, such as a guest entering user-profile information over the Internet. Data-entry component 212 is also capable of gathering guest information without guest interaction using behavioral data collection and pattern recognition techniques. As could be appreciated by one skilled in the relevant art, data-entry component 212 includes a myriad of forms including a computer, a terminal, a kiosk, a telephony device, a television, a personal data assistant, a consumer electronics device, a speaker, a guest-monitoring application, and a default-settings programming device.

Administrative console 214 is responsible for enabling an individual with administrative authority to control and monitor all or part of the PHMS system depending on the individual. For example, a hotel manager may need greater control aid monitoring capabilities than a hotel minibar stocker, who only needs to check guest minibar preferences and usage. Control module 210 can also be programmed through administrative console 214 if the user has the appropriate authority.

Media server 216 stores media content preferably received from MCDS 118 via network 112. Media content may also be stored on media server 118 from many other sources including the Internet and a media player such as a DVD player or VCR. Methods of storing media on servers are conventional in nature. Any method that accomplishes this objective is suitable for the present invention. Media is selected for storage based on the user profiles of hospitality site 110 guests. For instance, one guest may desire to watch a particular Japanese cartoon. Before or during the guest's stay, control module 210 or hotel staff negotiates with a media-content provider for the reception of the desired media selection. In a preferred embodiment, the desired media selection is received via MCDS 118. The desired media selection is stored on media server 216 until the hotel guest requests to view the selection. In addition to storing media for guest viewing, media server 216 also dynamically stores media content, such as television channels, from MCDS 118 in a network-compatible format and then transmits the media as directed by control module 210 based on user-profile preferences. For instance, one guest may only desire to view sports channels. Another guest may only be interested in news channels.

For every guest, control module 210 distills all available media down to only the desired media based on a user profile. Only the requested media content is offered to the guest. Guests, if desired, can then peruse their media selections without wading through dozens of unwanted channels. In this way, the guest realizes a significant convenience via a system requiring less information to be transmitted than currently exists in the prior art. Control module 210 can record all media sent to a media content receiving component (MCRC) 218A. The guest can then be billed for the media consumed. As would be appreciated by one skilled in the relevant art, control module 210 is also able to compile a list of all media consumed throughout a hospitality site for a given period of time. Guests would have the option of changing their user-profile preferences at any time to reflect changes in media preferences.

Guest interface 218 receives information and commands from other PHMS components and creates part of the guest-specified desired environment as stored in user-profile database 114. Guest interface 218 is also responsible for collecting data on guest activity that is then sent to the appropriate PHMS component. Guest interface 218 comprises MCRC 218A and PHMS controls 218B.

MCRC 218A receives media content in a network-compatible protocol and creates the appropriate media for the user. A preferred embodiment uses a television and a set-top device. A set-top device receives IP packets containing media information and converts the information to a National Television System Committee (NTSC) format that is transmitted to the television. The set-top device receives user input from a remote control and transmits the information to the appropriate PHMS component. As would be understood by one skilled in the relevant art, many other systems exist or could be designed for enabling an interactive media rendering system. Such a system could include a television, a monitor, a display device, a personal data assistant, a personal-communications system, a telephony device, a stereo, a consumer-electronics device, and a computer.

PHMS controls 218B are located throughout a PHMS-equipped facility. PHMS controls 218B are responsible for customizing the environment a particular guest experiences during their visit. PHMS controls 218B receive instructions from and provide feedback to control module 210, typically via network 112. In addition to providing feedback on the hospitality site 110 environment, such as the temperature of a particular hot tub, the PHMS controls 218B also act as points of data gathering on user activity. PHMS controls 218B include controls for facility amenities, guest rooms, media transmission, and guest tracking. Facility-amenity controls customize the services offered to a guest and the environment experienced by a guest throughout hospitality site 110. Facility-amenity controls include wake-up-time controls, check-out controls, incentive-program controls, health-club-usage controls, facility-access controls, minibar controls, Internet-access controls, telephony controls, business services controls, parking controls, special-assistance services controls, and laundry controls. Guest-room controls customize a guest's environment within a guest room. Guest-room controls include Internet-access controls, Internet-home-page controls, room-lighting controls, room-temperature controls, aroma controls, wake-up-time controls, convenience controls, and room-ventilation controls. Media-transmission controls customize the media selections available to a guest. Media-transmission controls include television-channel controls, volume controls, language controls, service-duration controls, viewing controls, ratings controls, protocol controls, and format controls. Guest-tracking controls monitor the location of a guest throughout the managed property and send this information back to control module 210. This information can then be used for customizing the facility-amenity and media-transmission controls located in hospitality site 110, as appropriate. For instance, if the guest that prefers news channels and the guest that prefers sports channels happened to be working out in a hotel's health club at the same time, the media-transmission controls would alter the media transmitted in the health club accordingly.

What the invention claimed is:

1. A computer implemented method for personalizing a guest's stay at a hospitality site, comprising:
   providing a database in a storage device accessible to a network, for storing a plurality of user profiles;
   populating, using a microprocessor, the user profiles in the database with user preferences of the guest;
   customizing a plurality of hospitality services offered to the guest based on user preferences stored in the user profile;
   monitoring the location of the guest in at least two different locations throughout a hospitality site, at least one of the different locations not being a guest room, wherein information relating to the guest's location is used to customize facility-amenity controls, facility-amenity preferences, or media transmission controls related to facility-amenities, located in the at least two different locations throughout the hospitality site;
   accessing the database to access the user preferences of the guest;
   receiving a plurality of different types of desired media content, based upon the accessed user preferences of the guest, the receipt of which occurs because of negotiations with a media-content provider, to allow for the reception of the desired media content for the guest;
   conditioning the different types of customized media content for distribution;
   storing one or more of the received customized media selections for viewing by a guest, wherein the stored customized media selections is available for viewing if the guest requests to view the selection;
   determining which type of conditioned media content is to be distributed via the network to the guest based on the location of and user preferences of the guest; and
   selectively distributing the conditioned media content to locations throughout a hospitality site via a network, in response to the guest requesting to view the selection.

2. The method of claim 1, wherein populating the user profiles includes receiving data from a data-entry component.

3. The method of claim 2, wherein the data-entry component includes one of the following: a computer, a terminal, a kiosk, a telephony device, a television, a personal data assistant, a consumer electronics device, a speaker, a guest-monitoring application, and a default-settings programming device.

4. The method of claim 1, wherein customizing the plurality of hospitality services includes customizing facility-amenity preferences.

5. The method of claim 4, wherein the facility-amenity preferences include: wake-up-time preferences, check-out preferences, incentive-program preferences, health-club-usage preferences, room-location preferences, facility access preferences, minibar preferences, Internet-access preferences, telephony preferences, concierge-desk preferences, business-services preferences, parking preferences, special-assistance services preferences, and laundry preferences.

6. The method of claim 1, wherein the user preferences further comprise room-environment preferences.

7. The method of claim 6, wherein the room-environment preferences include: home-page preferences, room-lighting preferences, décor preferences, room-temperature preferences, eating preferences, room-service preferences, convenience preferences, room-location preferences, sleeping-arrangement preferences, aroma preferences, bathroom-amenity preferences, and smoking preferences.

8. The method of claim 1, wherein customizing the plurality of hospitality services further includes customizing media preferences.

9. The method of claim 8, wherein the media preferences include: television-channel preferences, language preferences; genre preferences, service-duration preferences, viewing preferences, topic preferences, ratings preferences, actor preferences, style preferences, era preferences, artist preferences, protocol preferences, and format preferences.

10. The method of claim 1, wherein the customized media content includes stored media content and real-time-delivered content.

11. The method of claim 1, wherein providing the customized media content includes:
    receiving media content in an Internet-networking protocol;
    limiting guest access to the media content based on the user profile; and
    providing the media content to at least one receiving device.

12. The method of claim 11, wherein the Internet-networking protocol comprises at least one of the following:
    a Transmission Control Protocol/Internet Protocol (TCP/IP);
    a File Transfer Protocol (FTP);
    a Hypertext Transfer Protocol (HTTP); and
    an International Telecom Union (ITU) protocol.

13. The method of claim 11, wherein all media selections transmitted to the receiving device are stored for billing purposes in a computer readable medium.

14. The method of claim 11, wherein the receiving device includes a television.

15. The method of claim 11, wherein the receiving device further includes at least one of the following: a personal data assistant, a monitor, a personal-communications system, a telephony device, a stereo, a consumer-electronics device, and a computer.

16. The method of claim 11, further comprising providing for the communication of user input via the receiving device.

17. The method of claim 16, wherein the user input comprises at least one of the following: transaction information, the media preferences, an information request, a menu-navigation selection, and purchasing information.

18. The method of claim 16, further comprising delivering customized advertising to the receiving device based on the user input.

19. The method of claim 1, further comprising communicating the user preferences to a plurality of other property-management systems, whereby a visit by the guest to one of the plurality of other property-management systems can be customized.

20. A system for managing a plurality of hospitality services available to a hotel guest based on a plurality of user preferences stored in a user profile, comprising:
    a user-profile database for storing the user profile;
    a data-entry component in communication with the database for populating the user profile;

communication conditioning equipment configured to condition different media content types for distribution;

a multicast network configured to multicast the conditioned media content to hospitality sites;

a guest tracking component for monitoring a location of a guest in at least two different rooms located in geographically distinct locations throughout a hospitality site, at least one of the different rooms not being part of a guest room;

a control module in communication with the database for personalizing the plurality of hospitality services; and a guest-interface component in communication with the control module for receiving media content multicasted to the hospitality site, wherein the multimedia content is delivered to the hospitality site after negotiations with one or more media-content providers, in response to the control module accessing the user profile of the guest to determine user preferences; and a storage component for storing delivered media content during or prior to the arrival of the guest, wherein the stored media content can be made available to the guest in response the guest requesting to view the selection.

21. The system of claim 20, wherein the user profile in the user-profile database is associated with an individual.

22. The system of claim 20, wherein the user profile in the user-profile database is associated with a group of individuals.

23. The system of claim 20, wherein the user profile in the user-profile database comprises facility-amenity preferences.

24. The system of claim 23, wherein the facility-amenity preferences include: wake-up-time preferences, check-out preferences, incentive-program preferences, health-club-usage preferences, room-location preferences, facility-access preferences, mini-bar preferences, Internet-access preferences, telephony preferences, concierge-desk preferences, business-services preferences, parking preferences, special-assistance services preferences, and laundry preferences.

25. The system of claim 23, wherein the user profile in the user-profile database further comprises room-environment preferences.

26. The system of claim 25, wherein the room-environment preferences include: home-page preferences, room-lighting preferences, décor preferences, room-temperature preferences, eating preferences, room-service preferences, convenience preferences, room-location preferences, sleeping-arrangement preferences, aroma preferences, bathroom-amenity preferences, and smoking preferences.

27. The system of claim 20, wherein the user profile in the user profile database further comprises media preferences.

28. The system of claim 27, wherein the media preferences include: television-channel preferences, language preferences, genre preferences, service-duration preferences, viewing preferences, topic preferences, ratings preferences, actor preferences, style preferences, era preferences, artist preferences, protocol preferences, and format preferences.

29. The system of claim 20, wherein the data-entry component includes one of the following: a computer, a terminal, a kiosk, a telephony device, a television, a personal data assistant, a consumer electronics device, a speaker, a guest-monitoring application, and a default-settings programming device.

30. The system of claim 20, wherein the control module comprises computer-readable code that monitors and controls the PHMS system.

31. The system of claim 20, wherein the guest-interface component comprises:

a media-content receiving component (MCRC) coupled to the control module; and personalized hospitality management system (PHMS) controls coupled to the control module.

32. The system of claim 31, wherein the MCRC comprises at least one of the following: a television, a monitor, a display device, a personal data assistant, a personal communications system, a telephony device, a stereo, a consumer-electronics device, and a computer.

33. The system of claim 31, wherein the control module further comprises a record of all media selections transmitted to the MCRC.

34. The system of claim 31, wherein the PHMS controls comprise facility-amenity controls.

35. The system of claim 34, wherein the facility-amenity controls include controls for at least one of the following: wake-up-time controls, check-out controls, incentive-program controls, health-club-usage controls, facility-access controls, mini-bar controls, Internet-access controls, telephony controls, business-services controls, parking controls, special-assistance services controls, and laundry controls.

36. The system of claim 31, wherein the PHMS controls further comprise guest-room controls.

37. The system of claim 36, wherein the guest-room controls include controls for at least one of the following: Internet-access controls, Internet-home-page controls, room-lighting controls, room-temperature controls, olfactory controls, wake-up-time controls, convenience controls, and room-ventilation controls.

38. The system of claim 31, wherein the PHMS controls further comprise media-transmission controls.

39. The system of claim 38, wherein the media-transmission controls include controls for at least one of the following: television-channel controls, volume controls, language controls, service-duration controls, viewing controls, ratings controls, protocol controls, and format controls.

40. The system of claim 20, further comprising a media content delivery system (MCDS) coupled to the control module.

41. The system of claim 40, further comprising a plurality of other hospitality sites equipped with personalized hospitality management systems operationally coupled to the computer network, whereby a visit by the guest to one of the plurality of other hospitality sites can be customized.

42. The system of claim 41, further comprising a media server coupled to the control module.

43. The system of claim 42, wherein data stored on the media server includes data related to a media selection stored in a user profile.

44. The system of claim 43, wherein the data stored on the media server is received over the MCDS.

45. The system of claim 44, further comprising an administrative console.

46. The system of claim 45, wherein the administrative console includes computer readable code for enabling a PHMS administrator to monitor and control the PHMS.

* * * * *